US008074012B2

(12) United States Patent
Hsiao

(10) Patent No.: US 8,074,012 B2
(45) Date of Patent: Dec. 6, 2011

(54) FLASH MEMORY APPARATUS AND METHOD FOR SECURING A FLASH MEMORY FROM DATA DAMAGE

(75) Inventor: Wei-Yi Hsiao, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 381 days.

(21) Appl. No.: 12/400,149

(22) Filed: Mar. 9, 2009

(65) Prior Publication Data

US 2010/0005229 A1 Jan. 7, 2010

Related U.S. Application Data

(60) Provisional application No. 61/077,549, filed on Jul. 2, 2008.

(30) Foreign Application Priority Data

Oct. 30, 2008 (TW) ............................... 97141754 A

(51) Int. Cl.
*G06F 12/00* (2006.01)
(52) U.S. Cl. .................... 711/103; 711/162; 711/170

(58) Field of Classification Search .................. None
See application file for complete search history.

(56) References Cited

U.S. PATENT DOCUMENTS

| 7,275,140 B2 | 9/2007 | Paley |
| 2007/0086244 A1 | 4/2007 | Zilberman |

FOREIGN PATENT DOCUMENTS

| JP | 2008033801 | 2/2008 |
| JP | 2008146253 | 6/2008 |

OTHER PUBLICATIONS

International Search Report dated Oct. 15, 2009.
English language translation of abstract of JP 2008033801 (published Feb. 14, 2008).
English language translation of abstract of JP 2008146253 (published Jun. 26, 2008).

*Primary Examiner* — Shawn X Gu
(74) *Attorney, Agent, or Firm* — Thomas|Kayden

(57) ABSTRACT

A data backup method for a flash memory is provided. After writing of data to a plurality of written pages of a first block of a flash memory is completed, a last weak page of the written pages is determined. A first strong page corresponding to the last weak page is then determined. A plurality of strong pages between the first strong page and the last weak page are then determined. Data of the plurality of strong pages is the coped to a backup area of the flash memory for data recovery.

20 Claims, 8 Drawing Sheets

| Page 0 (S0) |
|---|
| Page 1 (S1) |
| Page 2 (S2) |
| Page 3 (S3) |
| Page 4 (W0) |
| Page 5 (W1) |
| Page 6 (S4) |
| Page 7 (S5) |
| Page 8 (W2) |
| Page 9 (W3) |
| ⋮ |

| Page 1 (S1) |
| Page 2 (S2) |
| Page 3 (S3) |
| |
| |
| |
| ⋮ |

| Page 1 (S1) |
| Page 2 (S2) |
| Page 3 (S3) |
| Page 6 (S4) |
| Page 7 (S5) |
| |
| ⋮ |

FIG. 5B

FLASH MEMORY APPARATUS AND METHOD FOR SECURING A FLASH MEMORY FROM DATA DAMAGE

CROSS REFERENCE TO RELATED APPLICATIONS

This application claims the benefit of U.S. Provisional Application No. 61/077,549, filed Jul. 2, 2008.

This Application claims priority of Taiwan Patent Application No. TW97141754, filed on Oct. 30, 2008, the entirety of which is incorporated by reference herein.

BACKGROUND OF THE INVENTION

1. Field of the Invention

The invention relates to flash memories, and more particularly to strong pages and weak pages of flash memories.

2. Description of the Related Art

Many electronic devices store data with flash memories, such as digital cameras and cell phones. A NAND flash memory comprises a plurality of blocks. Each of the blocks comprises a plurality of pages. Pages are divided into strong pages and weak pages. When data is written to a strong page, the strong page requires a shorter programming period to complete data writing. When data is written to a weak page, the weak page requires a longer programming period to complete data writing.

Referring to FIG. 1, a schematic diagram of a plurality of pages included by a block 100 of a NAND flash memory is shown. The block 100 comprises a plurality of pages. The pages are divided into strong pages and weak pages. For example, pages 0, 1, 2, 3, 6, 7 are strong pages, and pages 4, 5, 8, 9 are weak pages. In addition, a strong page has a corresponding weak page, and a weak page has a corresponding strong page. For example, the strong page 0 corresponds to the weak page 4, the strong page 2 corresponds to the weak page 8, and the strong page 3 corresponds to the weak page 9.

When data is written to a weak page, data stored in a strong page corresponding to the weak page is affected. When data is written to a strong page, data stored in a weak page corresponding to the strong page is also affected. Because a strong page has a shorter programming period, when errors occur in programming of the strong page, a weak page corresponding to the strong page has little probability to suffer from data damage. On the contrary, because a weak page has a longer programming period, when errors occur in programming of the weak page, a strong page corresponding to the weak page will probably suffer from data damage due to data errors of the weak page. A method for securing pages of a flash memory from data damage is therefore required.

BRIEF SUMMARY OF THE INVENTION

A method for securing a flash memory from data damage is provided. After writing of data to a plurality of written pages of a first block of a flash memory is completed, a last weak page of the written pages is determined. A first strong page corresponding to the last weak page is then determined. A plurality of strong pages between the first strong page and the last weak page are then determined. Data of the plurality of strong pages is the coped to a backup area of the flash memory for data recovery.

The invention also provides a flash memory apparatus. In one embodiment, the flask memory apparatus comprises a flash memory and a controller. After data is written to a plurality of written pages of a first block of the flash memory, the controller determines a last weak page of the written pages, determines a first strong page corresponding to the last weak page, determines a plurality of strong pages between the first strong page and the last weak page, and copies data of the plurality of strong pages to a backup area of the flash memory for data recovery.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is a schematic diagram of a plurality of pages included by a block of a NAND flash memory;

FIG. 4B is a schematic diagram of a backup area corresponding to the embodiment of FIG. 4A;

FIG. 5B is a schematic diagram of a backup area corresponding to the embodiment of FIG. 5A.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
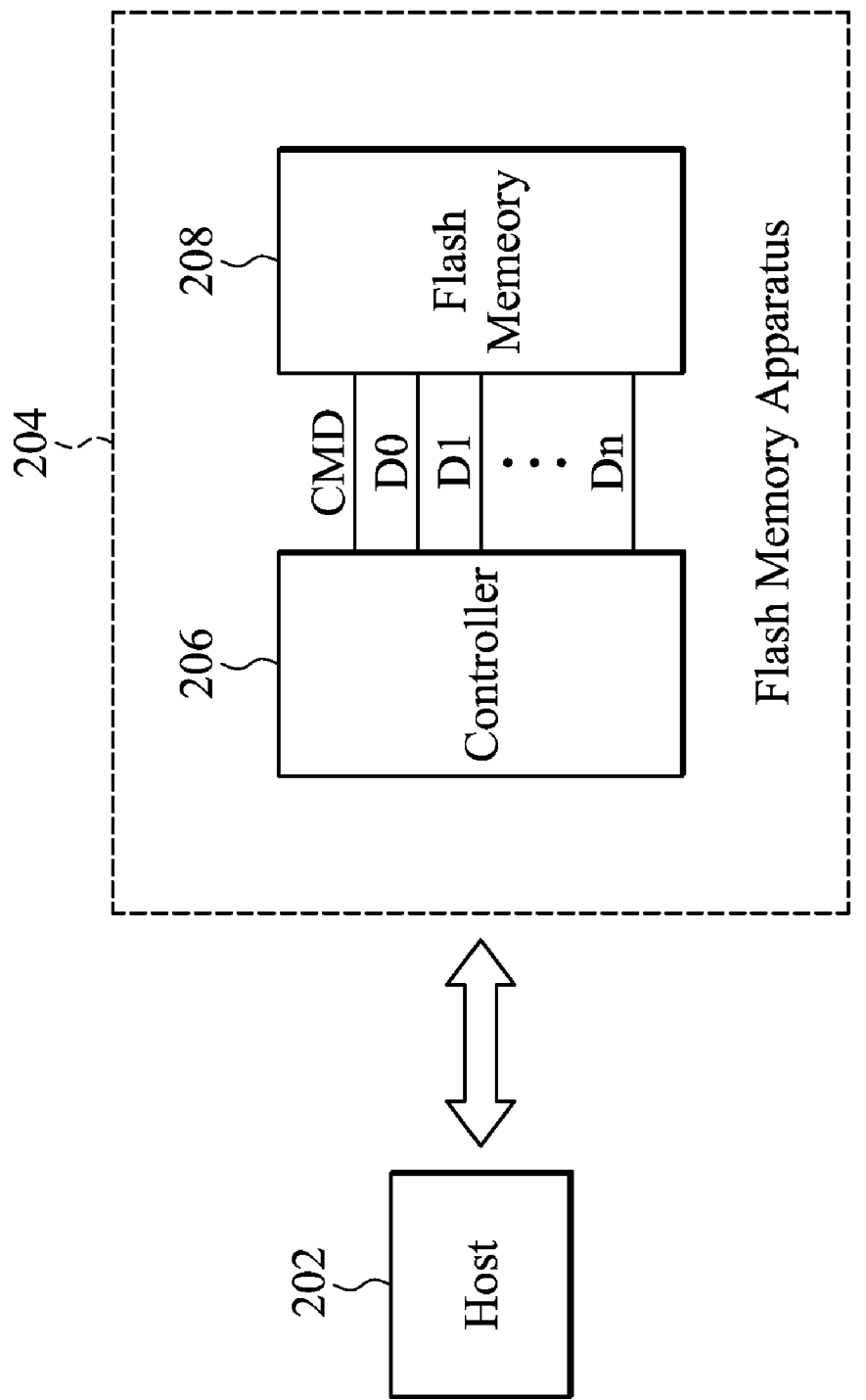
FIG. 2 is a block diagram of a flash memory apparatus according to the invention.

Referring to FIG. 2, a block diagram of a flash memory apparatus 204 according to the invention is shown. In one embodiment, the flash memory apparatus 204 comprises a controller 206 and a flash memory 208. The flash memory 208 comprises a plurality of blocks, each block comprises a plurality of pages for storing data. In one embodiment, the flash memory 208 is a NAND flash memory. The controller 206 is coupled to a host 202 and accesses data stored in the flash memory 208 according to instructions of the host 202. In one embodiment, a command line CMD and a plurality of data lines D0, D1, . . . , Dn are coupled between the controller 206 and the flash memory 208.

Figure 3:
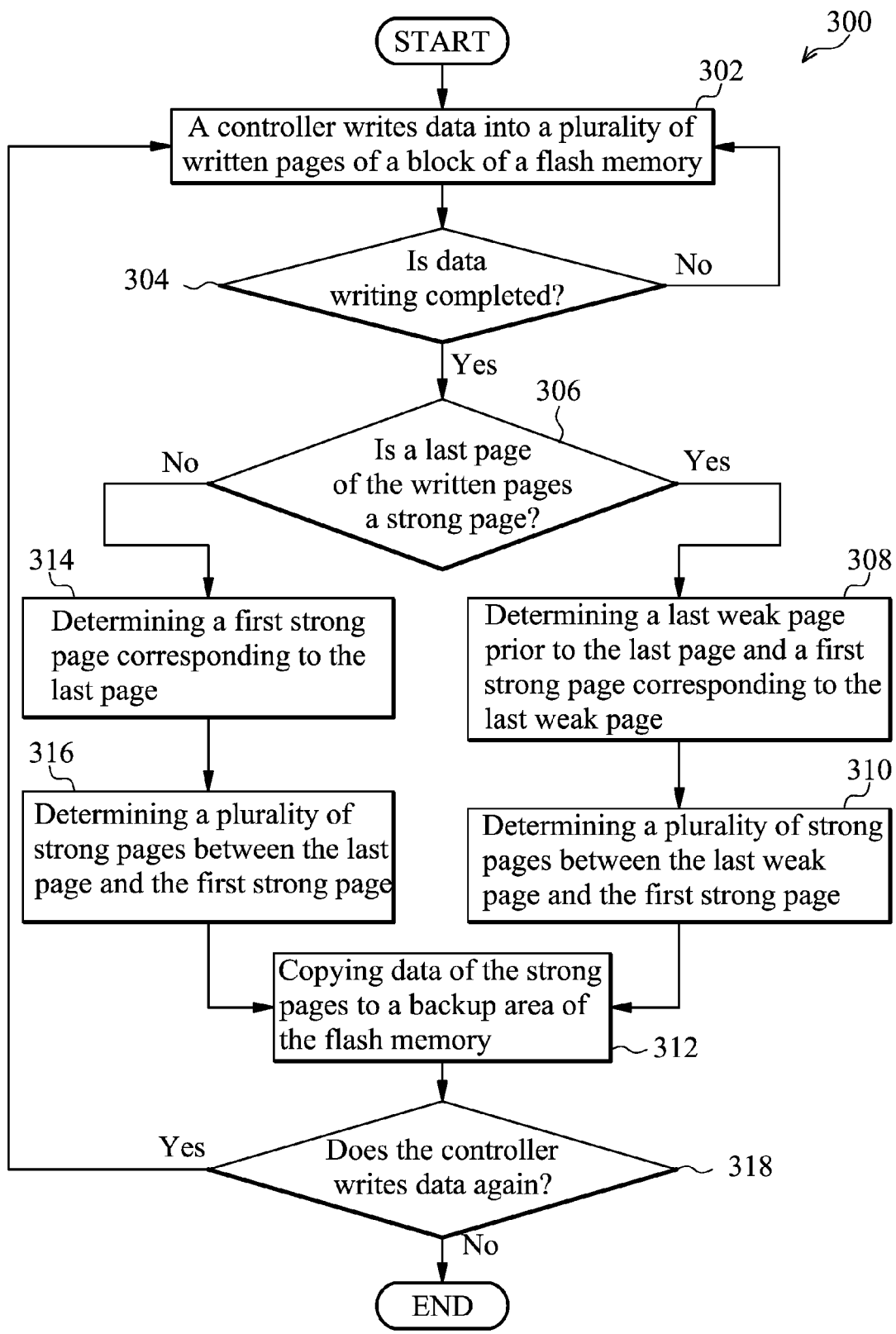
FIG. 3 is a flowchart of a method for backing up data of a flash memory according to the invention.

Referring to FIG. 3, a flowchart of a method 300 for backing up data of a flash memory according to the invention is shown. Whenever the controller 206 writes data to a plurality of written pages of a block of the flash memory 208 (step 302), the controller 206 first determines whether writing of data has been completed (step 304). In one embodiment, when the controller 206 is requested to write the data to the flash memory 208 by a 0x24 writing command sent from the host 202, the controller 206 detects whether a voltage of the data line D0 coupled between the controller 206 and the flash memory 208 changes from a busy state to a ready state to determine completion of data writing. In another embodiment, when the controller 206 is requested to write the data to the flash memory 208 by a 0x25writing command sent from the host 202, the controller 206 determines completion of data writing according to whether a 0x12 ending command is sent from the host 202. The aforementioned two examples are illustrated based on an SD flash memory apparatus 204. The timing of completion of data writing can be determined in a variety of ways according to the type of the interface between the host 202 and the flash memory apparatus 205.

Figure 4A:
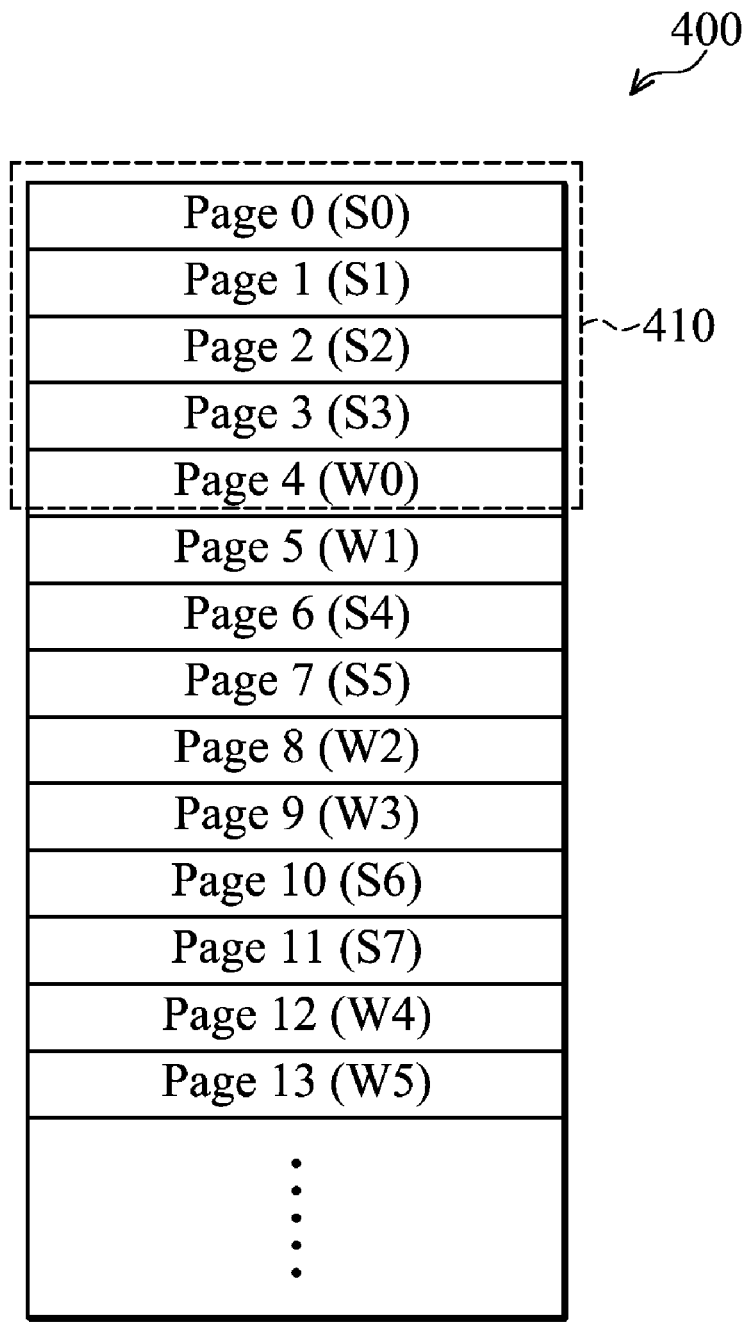
FIG. 4A shows an embodiment of pages of a block of a flash memory according to the invention.
Figure 4B:
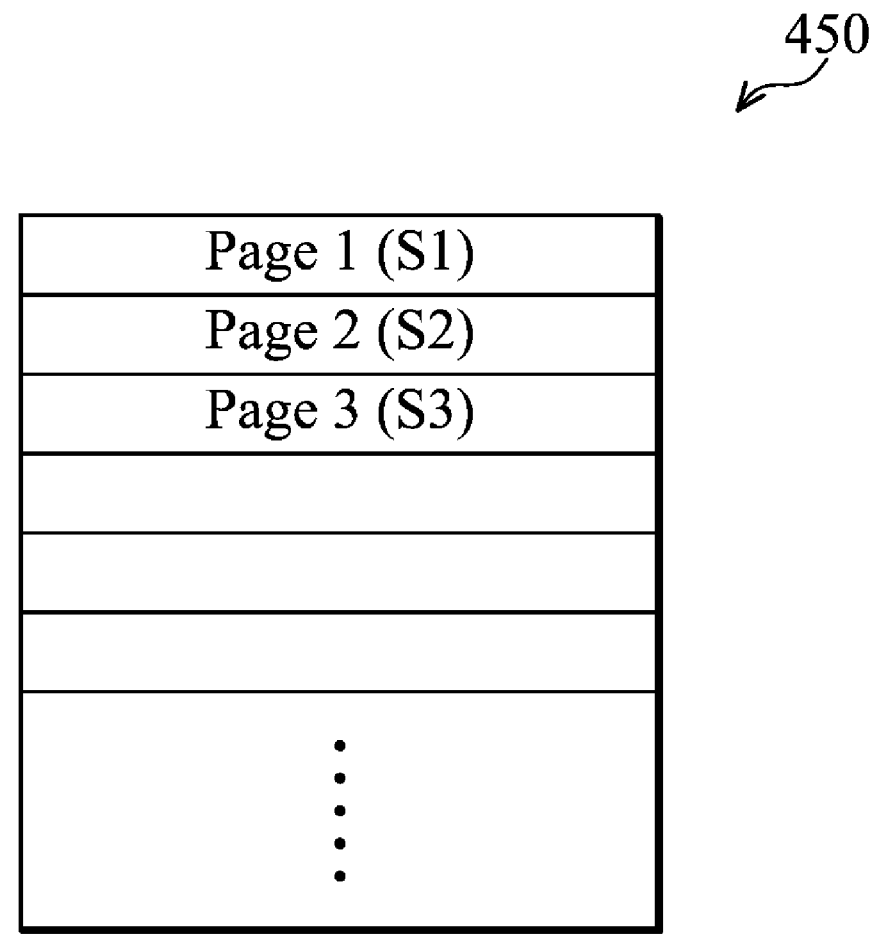

Referring to FIG. 4A, an embodiment of pages of a block 400 of the flash memory 208 according to the invention is shown. The block 400 comprises pages 0~13, wherein pages 0~3, 6~7, and 10~11 are strong pages, and pages 4~5, 8~9, and 12~13 are weak pages. In addition, pages 0 and 4, 1 and 5, 2 and 8, 3 and 9, 6 and 12, and 7 and 13 are respectively a pair of corresponding pages. Assume that the controller 206 writes data to written pages 0~4 of the flash memory 208, as shown by the index 410, the controller 206 then determines a last page 4 of the written pages 0~4. Because the last page 4 is a weak page (step 306), the controller 206 determines a first strong page 0 corresponding to the last page 4 (step 314), and further determines a plurality of strong pages 1, 2, and 3 between the first strong page 0 and the last page 4 (step 316). The controller 206 then copies the strong pages 1, 2, 3 to a backup area of the flash memory 408 for data recovery due to data damage (step 312). Referring to FIG. 4B, a schematic diagram of a backup area 450 corresponding to the embodiment of FIG. 4A is shown. The backup area 450 stores data corresponding to the strong pages 1, 2, and 3.

Figure 5A:
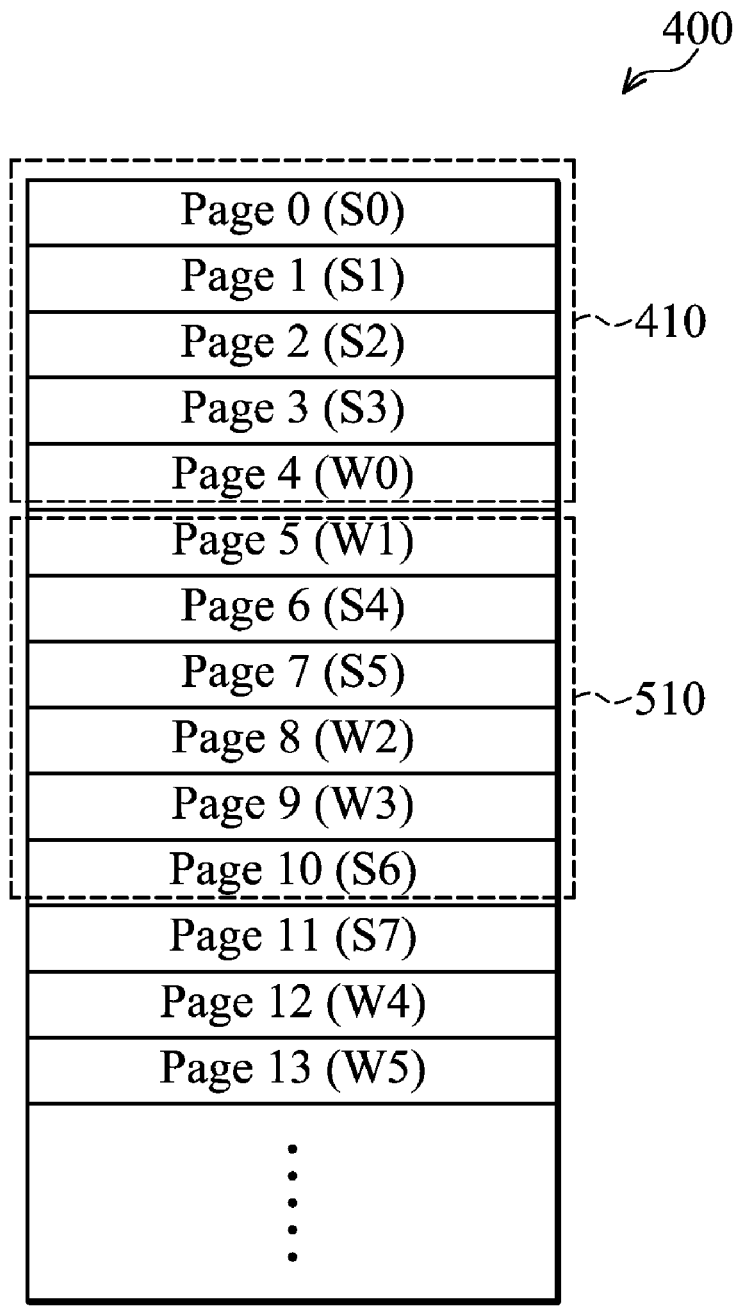
FIG. 5A shows an embodiment of pages of a block of a flash memory according to the invention.

Assume that the controller 206 further writes data to pages 510 of the block 400 of the flash memory 208 (steps 318, 302), as shown by the index 510 of FIG. 5A, after the data writing is completed (step 304), the controller 206 determines a last page 10 of the written pages 510. Because the last page 10 is a strong page (step 306), the controller 206 determines a last weak page 9 prior to the last page 10, and further determines a first strong page 3 corresponding to the last weak page 9 (step 308). The controller 206 then determines a plurality of strong pages 6 and 7 between the first strong page 3 and the last weak page 9 (step 310). The controller 206 then copies data of the strong pages 6 and 7 to a backup area of the flash memory 408 (step 312). Referring to FIG. 5B, a schematic diagram of a backup area 450 corresponding to the embodiment of FIG. 5A is shown. In addition to previously stored data of the strong pages 1, 2, and 3, the backup area 450 of FIG. 5B further stores data corresponding to the strong pages 6 and 7.

Figure 6:
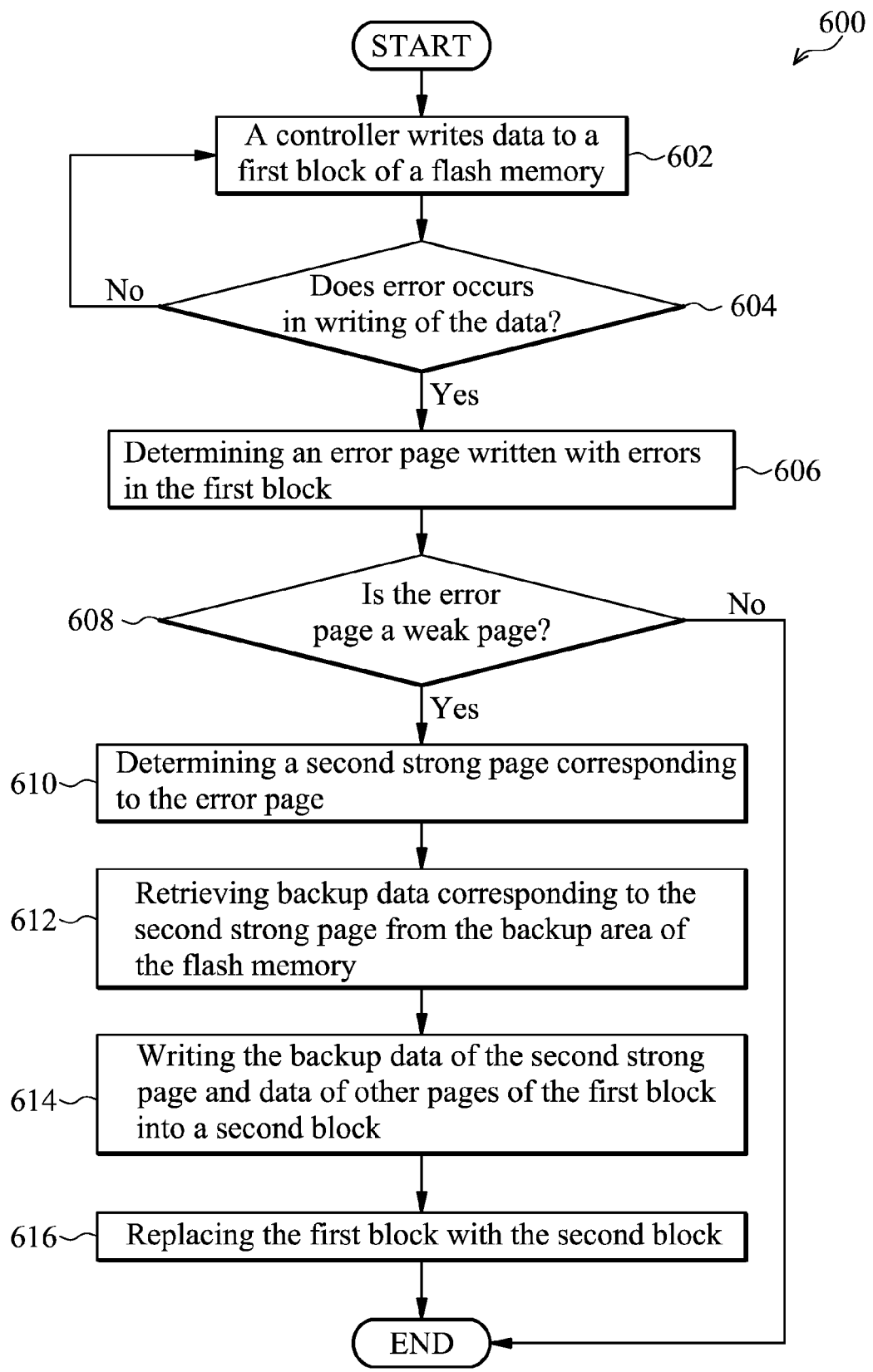
FIG. 6 is a flowchart of a method for recovering damaged data of pages of a block of a flash memory according to the invention.

Referring to FIG. 6, a flowchart of a method 600 for recovering damaged data of pages of a block of a flash memory according to the invention is shown. First, the controller 206 writes data to a first block of the flash memory 208 (step 602). If errors occur when the controller 206 writes data to the first block (step 604), the controller 206 determines an error page written with errors in the first block (step 606). Assume that power is suddenly cut off when the controller 206 writes data to the error page 13 of the block 400 shown in FIG. 5A, because the error page 13 is a weak page, the data stored in the strong page 7 corresponding to the error page 13 has a high probability that it may be damaged due to data errors of the error page 13. The controller 206 therefore must recover the data stored in the strong page 7.

First, the controller 206 determines whether the error page 13 is a weak page (step 608). If the error page is a strong page, data stored in a weak page corresponding to the error page has a low probability that it may be damaged, and no data recovery is required. Because the error page 13 is a weak page, the controller 206 determines a second strong page 7 corresponding to the error page 13 (step 610). The controller 206 then retrieves data corresponding to the second strong page 7 from the backup area 450 shown in FIG. 5B (step 612). The controller 206 then recovers data of the second strong page 7 according to the backup data retrieved from the backup area.

In one embodiment, the controller 206 first obtains a spare block from the flash memory 208 as the second block. The controller 206 then writes the backup data of the second strong page 7 and data of other pages of the first block 400 to the second block (step 614). The controller 206 then replaces the first block with the second block. In one embodiment, the controller 206 links the logical address previously corresponding to the first block 400 to the physical address of the second block. Finally, the controller 206 clears data of the first block to return the first block to a spare block.

A controller according to the invention, backs up data of string pages of a flash memory to a backup area whenever the controller completes data writing. When data of the strong pages is damaged due to data errors of weak pages corresponding to the strong pages, the controller retrieves backup data from the backup area to recover the damaged data of the strong pages.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for securing a flash memory from data damage, comprising:

after data has been written to a plurality of pages of a first block of the flash memory, determining a last weak page of the written pages;

determining a first strong page corresponding to the last weak page;

determining a plurality of strong pages between the first strong page and the last weak page; and copying data of the plurality of strong pages to a backup area of the flash memory for data recovery.

2. The method as claimed in claim 1, wherein determination of the last weak page comprising:

determining a last page of the plurality of written pages;

when the last page is a weak page, determining the last page to be the last weak page; and when the last page is a strong page, determining a weak page prior to the last page to be the last weak page.

3. The method as claimed in claim 1, wherein when a controller is requested to write the data to be written to the plurality of written pages to the flash memory by a 0×24 writing command received from a host, the controller determines completion of writing of the data to be written to the plurality of written pages according to whether a voltage of a data line coupled between the controller and the flash memory changes from a busy state to a ready state.

4. The method as claimed in claim 1, wherein when a controller is requested to write the data to be written to the plurality of written pages to the flash memory by a 0×25 writing command received from a host, the controller determines completion of writing of the data to be written to the plurality of written pages according to whether a 0×12 ending command is received from the host.

5. The method as claimed in claim 1, wherein the method further comprises:

when errors occur in writing of the data to be written to the plurality of written pages to an error page of the first block of the flash memory, determining whether the error page is a weak page;

when the error page is a weak page, determining a second strong page corresponding to the error page;
retrieving backup data corresponding to the second strong page from the backup area of the flash memory; and
recovering data of the second strong page according to the backup data.

6. The method as claimed in claim 5, wherein recovery of the data of the second strong page comprises:
obtaining a second block from the flash memory;
writing data of pages of the first block and the backup data of the second strong page to the second block;
replacing the first block with the second block; and
clearing the first block.

7. The method as claimed in claim 6, wherein replacing of the first block comprises linking a logical address previously corresponding to the first block to a physical address of the second block.

8. The method as claimed in claim 1, wherein a strong page has a shorter programming time period, and a weak page has a longer programming time period.

9. The method as claimed in claim 1, wherein pages of the first block are divided into strong pages and weak pages, and each of the weak pages corresponds to one of the strong pages, and when errors occur in writing of data to an error weak page, a strong page corresponding to the error weak page is determined to probably have data damage.

10. The method as claimed in claim 1, wherein the flash memory is a NAND flash memory.

11. A flash memory apparatus, comprising:
a flash memory; and
a controller, after data has been written to a plurality of pages of a first block of the flash memory, determining a last weak page of the written pages, determining a first strong page corresponding to the last weak page, determining a plurality of strong pages between the first strong page and the last weak page, and copying data of the plurality of strong pages to a backup area of the flash memory for data recovery.

12. The flash memory apparatus as claimed in claim 11, wherein the controller determines the last weak page by determining a last page of the plurality of written pages, determining the last page to be the last weak page when the last page is a weak page, and determining a weak page prior to the last page to be the last weak page when the last page is a strong page.

13. The flash memory apparatus as claimed in claim 11, wherein when the flash memory apparatus is requested to write the data to be written to the plurality of written pages to the flash memory by a 0×24 writing command received from a host, the controller determines completion of writing of the data to be written to the plurality of written pages according to whether a voltage of a data line coupled between the controller and the flash memory changes from a busy state to a ready state.

14. The flash memory apparatus as claimed in claim 11, wherein when the flash memory apparatus is requested to write the data to be written to the plurality of written pages to the flash memory by a 0×25 writing command received from a host, the controller determines completion of writing of the data to be written to the plurality of written pages according to whether a 0×12 ending command is received from the host.

15. The flash memory apparatus as claimed in claim 11, wherein when errors occur in writing of the data to be written to the plurality of written pages to an error page of the first block of the flash memory, the controller determines whether the error page is a weak page, determines a second strong page corresponding to the error page when the error page is a weak page, retrieves backup data corresponding to the second strong page from the backup area of the flash memory, and recovers data of the second strong page according to the backup data.

16. The flash memory apparatus as claimed in claim 15, wherein the controller obtains a second block from the flash memory, writes data of pages of the first block and the backup data of the second strong page to the second block, replaces the first block with the second block, and clears the first block, thus recovering the data of the second strong page.

17. The flash memory apparatus as claimed in claim 16, wherein the controller further links a logical address previously corresponding to the first block to a physical address of the second block, thus replacing of the first block with the second block.

18. The flash memory apparatus as claimed in claim 11, wherein a strong page has a shorter programming time period, and a weak page has a longer programming time period.

19. The flash memory apparatus as claimed in claim 11, wherein pages of the first block are divided into strong pages and weak pages, and each of the weak pages corresponds to one of the strong pages, and when errors occur in writing of data to an error weak page, a strong page corresponding to the error weak page is determined to probably have data damage.

20. The flash memory apparatus as claimed in claim 11, wherein the flash memory is a NAND flash memory.

* * * * *